No. 868,288. PATENTED OCT. 15, 1907.
F. O. NILSSON & J. A. JONSON.
CENTRIFUGAL FILTER.
APPLICATION FILED APR. 26, 1906.
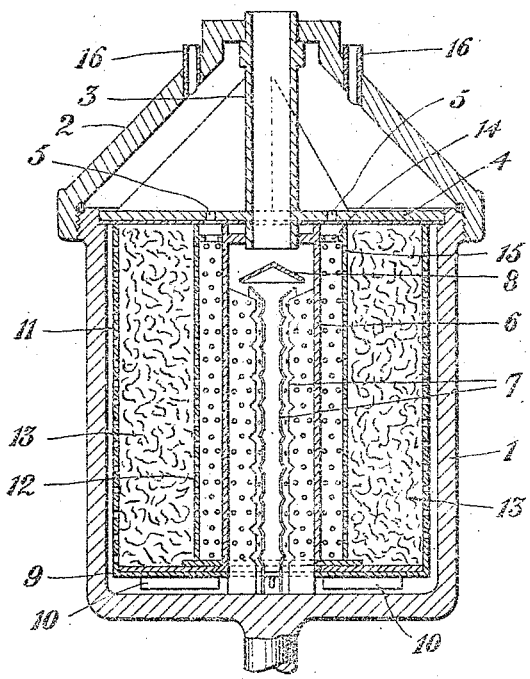
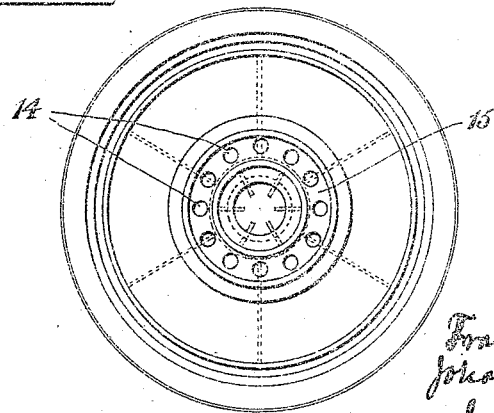
Witnesses
Evald Delmer
Karl Runeskog.
Inventors
Frans O. Nilsson
Johan A. Jonson
by Bergman
Att'y

UNITED STATES PATENT OFFICE.

FRANS OSKAR NILSSON AND JOHAN AXEL JONSON, OF STOCKHOLM, SWEDEN, ASSIGNORS TO AKTIEBOLAGET VINCENTRIFUGEN, OF STOCKHOLM, SWEDEN.

CENTRIFUGAL FILTER.

No. 868,288.  Specification of Letters Patent.  Patented Oct. 15, 1907.

Application filed April 20, 1906. Serial No. 312,836.

*To all whom it may concern:*

Be it known that we, FRANS OSKAR NILSSON and JOHAN AXEL JONSON, subjects of the King of Sweden, and residents of Stockholm, Sweden, have invented a new and useful Improvement in Apparatus for Improving the Quality of Liquids, of which the following is a specification, reference being had to the drawing accompanying and forming a part hereof.

This invention relates to a centrifugal apparatus for improving the quality of wine and the like.

It is well known to subject wine, beer, and the like, to the action of the centrifugal force in a centrifugal apparatus and thereupon to lead the liquid through a filter provided in the apparatus for removing the solid particles from the liquid. It is further well known to improve the quality of the said liquids by subjecting them in a centrifugal apparatus or in a fixed vessel having a rotating stirring device to a churning action.

The object of the present invention is to provide an apparatus by which a preliminary treating of wine or the like can be obtained before the same is subjected to filtering action by means of a centrifugal filter, and the invention consists, chiefly, in the combination of a bowl, a centrally arranged liner having perforated wings at the inside thereof, and a filter surrounding the said liner, said filter communicating with the said liner in such a manner that the liquid entering the apparatus is caused to first run through the liner, in the longitudinal direction thereof, and then through the filter, suitably in a radial direction.

In order to make the invention more easily understood we will hereinafter more particularly describe the same with reference to the accompanying drawing illustrating one form of our improved apparatus.

Figure 1 shows a vertical section of the apparatus, and Fig. 2 shows a plan-view of the same, the cover being removed.

Referring to the drawing, the apparatus consists of a bowl of substantially the same shape as the bowl of a usual milk centrifugal separator. The said bowl 1 may be driven by means of any well known or suitable driving-device. The top of the bowl 1 is closed by an outer cover 2, and through an opening in the top of the latter passes a central inlet-pipe 3 which suitably may be integral with an inner cover 4 provided with openings 5 for the liquid. Below the said cover 4 is in the bowl provided a centrally located cylinder 6 having a number of, suitably, radial wings 7 extending from the wall of the said cylinder towards the center of the latter.

Close below the lower mouth of the central inlet-pipe 3 is provided a spreading-disk 8 for spreading the liquid admitted through the inlet-pipe 3 and for leading the same towards the wings 7. The latter are provided with perforations of suitable shape and size, so that the wings work as stirrers or churners for the liquid. The said central cylinder 6 is at the lower end connected to or made integral with an intermediate bottom 9 which by means of flanges 10 placed radially or in any other suitable manner is held at a distance above the bottom of the bowl so as to form between the said bottoms a passage for the liquid from the interior of the said central cylinder 6 to the outer parts of the interior of the bowl 1. At a distance from the cylindrical wall of the bowl is provided a perforated cylinder 11 and outside the central cylinder 6 and at a distance from the same is provided another perforated cylinder 12. The annular space formed between the said perforated cylinders 11 and 12 contains a suitable filtering material 13, such as excelsior, through which the liquid passes radially or substantially radially towards the center. Between the cylinders 6 and 12 is an annular space in the upper part of which is provided a flange 15 having perforations 14 and extending from the cylinder 12, the said annular space thus communicating with the space above the cover 4 by the said perforations 12 and the openings 5 in the cover 4. The cover 2 is provided with outlet-pipes 16 for the liquid. Below the inner cover 4 is placed a tightening plate 17 resting on the upper edges of the cylinders 6, 11 and 12 and on a shoulder on the cylindrical wall of the bowl 1.

The apparatus described above works as follows: The wine, or the like, to be treated is admitted through the inlet-pipe 3 after the bowl has been put in rotation and is kept rotating at suitable speed, and falls down onto the spreading-disk 8, distributing the liquid towards the wings 7 and to the inner side of the cylinder 6. The liquid is now caught by the said wings which on account of their perforations subject the liquid to a violent working as in churning. The said process may be continued also in the space between the bottom 9 and the bottom of the bowl if the wings or flanges 10 have a shape suitable for the said purpose. In as much as the liquid while being treated flows towards the periphery of the bowl it will be subjected to an increased separating process which in the space between the cylindrical wall of the bowl 1 and the cylinder 11 results in that solid or slimy particles contained in the liquid are deposited on the inside of the cylindrical wall of the bowl. The liquid thereupon passes towards the center through the filtering material between the cylinders 11 and 12. The movement through the said material causes a further working of the liquid, and at the same time small solid particles which have not been removed by the foregoing centrifugal process, will be retained by the filtering material, the latter coacting in this respect with the centrifugal force. After the liquid has passed the filtering material it arrives through the perforations of the cylinder 12 into the space between the latter and the central cylinder 6, and from the said space the liquid flows through the perforations 14 and the openings 5 into the space between the covers 4 and 2 and leaves the apparatus through the outlet-pipes 16.

Having now described our invention what we claim as new and desire to secure by Letters Patent is:

1. In a centrifugal apparatus for improving liquids the combination of a bowl, a centrally arranged liner having perforated wings at the inside thereof, and a filter surrounding the said liner, said filter communicating with the said liner in such a manner that the liquid entering the apparatus is caused to first run through the liner, in the longitudinal direction thereof, and then through the said filter, substantially as and for the purpose set forth.

2. In a centrifugal apparatus for improving liquids the combination of a bowl, a cylinder arranged centrally within the said bowl, perforated wings attached to the inside of the said cylinder, and a filter surrounding the said cylinder, at a distance therefrom, said cylinder communicating, at its lower end, with the outer side of the said filter, substantially as and for the purpose set forth.

3. In a centrifugal apparatus for improving liquids, the combination of a bowl, an inlet-pipe in the same, a central cylinder below the said inlet-pipe, perforated wings in the said central cylinder, two perforated cylinders forming between them an annular space, and a filtering material in the said annular space, substantially as and for the purpose set forth.

4. In a centrifugal apparatus for improving liquids the combination of a bowl, a cover on the same, a central inlet-pipe, an inner perforated cover, a central cylinder below the said inlet-pipe and communicating therewith, perforated wings in the said central cylinder, an intermediate bottom in the bowl, flanges on the underside of the said bottom, a perforated cylinder surrounding the said central cylinder and forming together with the latter an annular space, another perforated cylinder forming together with the firstmentioned perforated cylinder an annular space, and a filtering material in the lastmentioned annular space, substantially as described.

In testimony whereof we have signed our names to this specification in the presence of two subscribing witnesses.

FRANS OSKAR NILSSON.
JOHAN AXEL JONSON.

Witnesses:
EVALD I. UMAR,
KARL RUNCSKOG.